(12) United States Patent
Liu et al.

(10) Patent No.: US 7,943,543 B1
(45) Date of Patent: May 17, 2011

(54) IONIC LIQUID-SOLID-POLYMER MIXED MATRIX MEMBRANES FOR GAS SEPARATIONS

(75) Inventors: Chunqing Liu, Schaumburg, IL (US); Santi Kulprathipanja, Inverness, IL (US); Mark E. Schott, Palatine, IL (US); Stephen T. Wilson, Libertyville, IL (US)

(73) Assignee: UOP LLC, Des Plaines, IL (US)

( * ) Notice: Subject to any disclaimer, the term of this patent is extended or adjusted under 35 U.S.C. 154(b) by 521 days.

(21) Appl. No.: 11/537,294

(22) Filed: Sep. 29, 2006

(51) Int. Cl.
*B01J 20/28* (2006.01)
*B01D 53/22* (2006.01)

(52) U.S. Cl. ............... 502/4; 96/4; 95/45; 95/51

(58) Field of Classification Search .......... 96/4 –14; 95/43 –55; 502/4, 60
See application file for complete search history.

(56) References Cited

U.S. PATENT DOCUMENTS

| | | | |
|---|---|---|---|
| 4,740,219 A | 4/1988 | Kulprathipanja et al. | 55/16 |
| 4,925,459 A | 5/1990 | Rojey et al. | 155/16 |
| 4,968,430 A | 11/1990 | Hildenbrand et al. | 210/640 |
| 5,127,925 A | 7/1992 | Kulprathipanja et al. | 55/16 |
| 5,431,864 A | 7/1995 | Rao et al. | 264/29.5 |
| 5,447,559 A | 9/1995 | Rao et al. | 96/4 |
| 5,507,856 A | 4/1996 | Rao et al. | 95/50 |
| 5,538,536 A | 7/1996 | Fuentes et al. | 95/45 |
| 5,716,527 A * | 2/1998 | Deckman et al. | 210/651 |
| 5,827,602 A * | 10/1998 | Koch et al. | 429/328 |
| 6,048,388 A | 4/2000 | Schwarz | 106/31.27 |
| 6,248,682 B1 | 6/2001 | Thompson et al. | 502/4 |
| 6,500,233 B1 | 12/2002 | Miller et al. | 95/50 |
| 6,503,295 B1 | 1/2003 | Koros et al. | 95/51 |
| 6,508,860 B1 | 1/2003 | Kulkarni et al. | 95/51 |
| 6,562,110 B2 | 5/2003 | Koros et al. | 96/4 |
| 6,579,343 B2 | 6/2003 | Brennecke et al. | 95/51 |
| 6,585,802 B2 | 7/2003 | Koros et al. | 95/51 |
| 6,605,140 B2 | 8/2003 | Guiver et al. | 96/4 |
| 6,626,980 B2 | 9/2003 | Hasse et al. | 95/51 |
| 6,645,276 B2 * | 11/2003 | Kang et al. | 96/5 |
| 6,726,744 B2 | 4/2004 | Kulprathipanja et al. | 95/45 |
| 6,740,143 B2 | 5/2004 | Corbin et al. | 96/11 |
| 6,755,900 B2 | 6/2004 | Koros et al. | 96/10 |
| 6,863,983 B2 | 3/2005 | Tsapatsis et al. | 428/446 |
| 6,932,859 B2 | 8/2005 | Koros et al. | 96/10 |
| 6,946,015 B2 | 9/2005 | Jorgensen et al. | 95/51 |
| 6,958,085 B1 * | 10/2005 | Parrish | 95/44 |
| 6,997,971 B1 | 2/2006 | Young et al. | 95/45 |
| 7,025,804 B2 | 4/2006 | Simmons et al. | 95/51 |
| 7,109,140 B2 | 9/2006 | Marand et al. | 502/4 |
| 7,138,006 B2 | 11/2006 | Miller et al. | 95/45 |
| 7,166,146 B2 | 1/2007 | Miller et al. | 95/45 |
| 7,179,321 B2 * | 2/2007 | Kang et al. | 95/45 |
| 7,208,605 B2 * | 4/2007 | Davis, Jr. | 548/110 |
| 7,306,647 B2 * | 12/2007 | Miller et al. | 95/45 |
| 7,344,585 B1 * | 3/2008 | Kulprathipanja et al. | 95/45 |
| 7,476,636 B2 * | 1/2009 | Kulkarni et al. | 502/60 |
| 7,485,173 B1 * | 2/2009 | Liu et al. | 95/45 |
| 2002/0053284 A1 | 5/2002 | Koros et al. | 95/51 |
| 2003/0220188 A1 | 11/2003 | Marand et al. | 502/60 |
| 2005/0043167 A1 | 2/2005 | Miller et al. | 502/4 |
| 2005/0150383 A1 * | 7/2005 | Kang et al. | 96/11 |
| 2005/0230305 A1 | 10/2005 | Kulkarni et al. | 210/500.23 |
| 2005/0268782 A1 | 12/2005 | Kulkarni et al. | 96/4 |
| 2006/0107830 A1 | 5/2006 | Miller et al. | 95/45 |
| 2006/0117949 A1 | 6/2006 | Kulkarni et al. | 95/45 |
| 2007/0022877 A1 | 2/2007 | Marand et al. | 95/51 |
| 2007/0119302 A1 * | 5/2007 | Radosz et al. | 96/5 |

FOREIGN PATENT DOCUMENTS

| | | |
|---|---|---|
| WO | WO 2005/113121 A1 | 1/2005 |
| WO | WO 2005/012397 A2 | 10/2005 |

OTHER PUBLICATIONS

McKeown, et al. Chem. Commun., 2004, 230.
Bonhote et al., Inorg. Chem., 1996, 35, 1168.

* cited by examiner

*Primary Examiner* — Robert A Clemente
(74) *Attorney, Agent, or Firm* — Mark Goldberg

(57) ABSTRACT

New ionic liquid-solid-polymer mixed matrix membranes were proposed for gas separations such as $CO_2$ removal from natural gas or $N_2$. For the new mixed matrix membranes, the solids such as carbon molecular sieves, microporous molecular sieves, MCM-41 type of mesoporous molecular sieves, or polymer of intrinsic microporosity (PIM) are coated (or impregnated) with ionic liquids such as 1-butyl-3-methyl imidazolium bis[trifluoromethylsulfonyl]amide. The ionic liquids coated or impregnated solids are then dispersed in the continuous polymer matrix to form mixed matrix membranes. These hybrid mixed matrix membranes will combine the properties of the continuous polymer phase, the ionic liquids, and the dispersed ionic liquids coated or impregnated solids phase, which will possibly open up new opportunities for gas separation processes such as $CO_2$ separation from natural gas or flue gas.

14 Claims, No Drawings

IONIC LIQUID-SOLID-POLYMER MIXED MATRIX MEMBRANES FOR GAS SEPARATIONS

BACKGROUND OF THE INVENTION

In the last 30-35 years polymer membrane-based gas separation processes have evolved rapidly. Inorganic membranes were developed during World War II for uranium isotope separation. Both polymer and inorganic membranes, have inherent limitations in terms of one or more of the following desirable membrane properties: selectivity, permeability, and stability. To enhance membrane selectivity and permeability, a new type of membranes, mixed matrix membranes, were developed more recently. To date, almost all of the mixed matrix membranes reported in the literature are hybrid blend membranes comprising insoluble solid domains such as molecular sieves or carbon molecular sieves embedded in a polymer matrix. See U.S. Pat. No. 6,626,980; US 2003/0220188 A1; US 2005/0043167 A1; US 2002/0053284 A1; U.S. Pat. No. 6,755,900; U.S. Pat. No. 6,500,233; U.S. Pat. No. 6,503,295; and U.S. Pat. No. 6,508,860. The strategy for the development of mixed matrix membranes is to incorporate fillers such as solid, liquid, or both solid and liquid fillers into continuous polymer matrices. The polymer matrices are selected from either glassy polymers (e.g., polyimide, polysulfone, polyethersulfone, or cellulose acetate) or rubbery polymers (e.g., silicon rubber).

Ionic liquids (ILs) are a relatively new class of compounds that have received wide attention in recent years as "green" designer solvents that may potentially replace many conventional volatile organic solvents in reaction and separation processes. These unique compounds are organic salts that are liquid over a wide range of temperatures near room temperature and have essentially no measurable vapor pressure. An ionic liquid is a salt in which the ions are poorly coordinated, which results in these solvents being liquid below 100° C., or even at room temperature (room temperature ionic liquids, RTIL's). At least one ion has a delocalized charge and one component is organic, which prevents the formation of a stable crystal lattice.

Recently, ionic liquids have been investigated for their potential for gas separation, including the removal of $CO_2$ from stack gas generated in coal-fired power plants. Most recently, ionic liquids have been used to replace traditional solvents for supported liquid membranes (also called facilitated transport membranes) to take advantage of their unique properties for gas separations. Ionic liquids are particularly attractive in a membrane separation device because their extremely low volatility will minimize solvent losses from the membrane. Supported liquid membranes use porous supports whose pores are impregnated with a solvent such as an ionic liquid. Results for a porous polyethersulfone saturated with ethylmethylimidazolium dicyanamide have shown that the $CO_2/CH_4$ ideal selectivity of this supported liquid membrane was above the upper-bound for the $CO_2/CH_4$ Robeson plot.

Ionic liquids are particularly attractive in a membrane separation device because their extremely low volatility will minimize solvent losses from the membrane. The durability and retention of the ionic liquids, however, are still not good enough for real process conditions. Ionic liquids must be immobilized in robust, high-flux supports.

SUMMARY OF THE INVENTION

The present invention involves an enhancement to the durability and retention of ionic liquids in membranes for various applications including the separation of $CO_2$ from natural gas. It is preferred that these membranes achieve an $\alpha_{CO2/CH4}$ at least higher than 50 and $PCO_2$ of at least 10 barrer for $CO_2$ removal from natural gas. In one embodiment, the present invention involves a mixed matrix membrane comprising a continuous polymer matrix, molecular sieves selected from the group consisting of microporous molecular sieves, mesoporous molecular sieves, carbon molecular sieves or polymers of intrinsic microporosity; and ionic liquids. In another embodiment of the present invention, the molecular sieves or the polymers of intrinsic microporosity are first coated or impregnated with the ionic liquids and then dispersed into a continuous polymer matrix.

New ionic liquid-solid-polymer mixed matrix membranes have been found useful for gas separations such as $CO_2$ removal from natural gas or from $N_2$. These mixed matrix membranes contain solids such as carbon molecular sieves, microporous molecular sieves, MCM-41 type of mesoporous molecular sieves, or polymers of intrinsic microporosity (PIMs) that are coated (or impregnated) with ionic liquids such as 1-butyl-3-methyl imidazolium bis[trifluoromethylsulfonyl]amide. The PIMs described in this invention refer to a new type of polymers with intrinsic microporosity formed by randomly contorted molecular structures. See WO 2005/012397 A2 and WO 2005/113121 A1. The rotational freedom of the PIMs has been removed from the polymer backbone. These polymers exhibit properties analogous to those of conventional microporous materials including large and accessible surface areas, interconnected micropores of less than 2 nm in size, as well as high chemical and thermal stability. In addition, possess properties of conventional polymers including good solubility and easy processability. The ionic liquid-coated or impregnated solids are then dispersed in the continuous polymer matrix to form mixed matrix membranes. These hybrid mixed matrix membranes will combine the properties of the continuous polymer phase, the ionic liquids, and the dispersed ionic liquids coated or impregnated solids phase. These new membranes are expected to exhibit improved selectivity and permeability compared to the pure polymer matrix.

DETAILED DESCRIPTION OF THE INVENTION

Recently, there have been few studies that have examined the use of ionic liquids for the preparation of supported liquid polymer membranes and supported liquid ceramic membranes. Ionic liquids possess a number of unique properties that can be useful in the context of liquid membranes. For instance, ionic liquids have high thermal stability, high ionic conductivity, and are non-flammable. Unlike traditional organic solvents, chemical modification of the cation alkyl groups or the anion can produce application specific solvents. The ionic liquids in these supported liquid membranes, however, are still not stable enough for real gas separation applications. The term "liquid ionic compound" or "LIC" as used herein refers to a nonpolymeric salt comprising an organic cation and any of a variety of anions that is reasonably fluid under ambient conditions. The salt may comprise monovalent or polyvalent anions or cations. In addition, the LIC may be a single salt or a mixture of salts. The anions described herein are typically relatively non-nucleophilic anions. The term "ambient conditions" as used herein refers to temperatures from about 1° to about 100° C. and pressures of about 1 atmosphere. It is appreciated that some LICs useful in the present invention may have melting points above ambient temperatures. However, all LICs can be distinguished from conventional "molten salts", such as sodium chloride, requiring excessive temperatures (>250° C.) to achieve a liquid phase. The LICs of the present invention have advantageously negligible vapor pressures under ambient conditions and often form stable liquids at temperatures up to about 300° C. LICs also have a wide range of miscibilities with organic solvents and water; however, the LIC is not necessarily soluble in either one or the other of organic solvents or water. LICs for use in the present invention include, but are not limited to, quaternary 5- and 6-membered-ring aromatic heterocycles, such as imidazolium salts, pyridinium salts, pyrimidinium salts, and the like.

In one embodiment, LICs of Formula I are employed and these LICs are imidazolium derivatives:

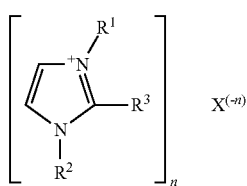

Formula I where: $R^1$ is hydrogen, $C_1$-$C_{18}$ alkyl, or $C_1$-$C_6$ alkylamine; $R^2$ is $C_1$-$C_{18}$ alkyl, $C_2$-$C_6$ alkenyl, $C_3$-$C_6$ cycloalkyl, $C_3$-$C_8$ cycloalkenyl, aryl, substituted aryl, aryl($C_1$-$C_4$ alkyl), or substituted aryl($C_1$-$C_4$ alkyl); $R^3$ is hydrogen, $C_1$-$C_{18}$ alkyl, $C_2$-$C_6$ alkenyl, $C_3$-$C_6$ cycloalkyl, $C_3$-$C_8$ cycloalkenyl, aryl, substituted aryl, aryl($C_1$-$C_4$ alkyl), or substituted aryl($C_1$-$C_4$ alkyl); and X is an anion selected from the group consisting of hydroxide, chloride, bromide, iodide, borate, tetrafluoroborate ($BF_4^-$), cuprate, Cu(I)Cl$_2$ anion, phosphate, hexafluorophosphate ($PF_6^-$), hexafluoroantimonate, perchlorate, nitrite, nitrate, sulfate, methylsulfate, bis(trifluormethylsulfonyl)imide ($Tf_2N^-$), a carboxylate, a sulfonate, a sulfonimide, and a phosphonate; and n is an integer from 1 to 4.

In another embodiment LICs of Formula II are employed for gas purification:

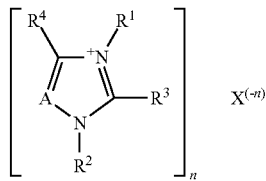

Formula II where: $R^1$ is hydrogen, $C_1$-$C_{18}$ alkyl, or $C_1$-$C_6$ alkylamine; A is —N— or —C($R^5$)—; $R^2$ is $C_1$-$C_{18}$ alkyl, $C_2$-$C_6$ alkenyl, $C_3$-$C_6$ cycloalkyl, $C_3$-$C_8$ cycloalkenyl, aryl, substituted aryl, aryl($C_1$-$C_4$ alkyl), or substituted aryl($C_1$-$C_4$ alkyl); $R^3$, $R^4$, and $R^5$ are independently hydrogen, $C_1$-$C_{18}$ alkyl, $C_2$-$C_6$ alkenyl, $C_3$-$C_6$ cycloalkyl, $C_3$-$C_8$ cycloalkenyl, aryl, substituted aryl, aryl($C_1$-$C_4$ alkyl), or substituted aryl($C_1$-$C_4$ alkyl); X is an anion selected from the group consisting of hydroxide, chloride, bromide, iodide, borate, tetrafluoroborate, cuprate, Cu(I)Cl$_2$ anion, phosphate, hexafluorophosphate, hexafluoroantimonate, perchlorate, nitrite, nitrate, sulfate, methylsulfate, bis(trifluormethylsulfonyl)imide ($Tf_2N^-$), a carboxylate, a sulfonate, a sulfonimide, and a phosphonate; and n is an integer from 1 to 4.

In another embodiment LICs of Formula III are employed for gas purification:

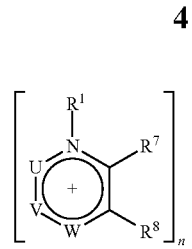

Formula III where: $R^1$ is as defined above; U, V, and W are independently —N— or —C($R^9$)—, provided that U and V are not simultaneously —N—; $R^7$, $R^8$, and $R^9$ are independently hydrogen, $C_1$-$C_6$ alkyl, $C_2$-$C_6$ alkenyl, $C_3$-$C_6$ cycloalkyl, $C_3$-$C_8$ cycloalkenyl, aryl, substituted aryl, aryl($C_1$-$C_4$ alkyl), or substituted aryl($C_1$-$C_4$ alkyl); X is as defined above; and n is as defined above.

The term "$C_1$-$C_6$ alkyl" refers to a monovalent linear or branched chain of from one to six carbon atoms, such as methyl, butyl, 2,3-dimethylbutyl, and the like.

Similarly, the term "$C_1$-$C_{18}$ alkyl" refers to a monovalent linear or branched chain of from one to eighteen carbon atoms, such as butyl, octyl, 2-methyldodecyl, and the like.

The term "$C_2$-$C_6$ alkenyl" refers to a monovalent linear or branched chain of from two to six carbon atoms containing one or more double bonds, such as ethenyl, 2-propenyl, 3-methyl-3-butenyl, and the like.

The term "$C_2$-$C_6$ alkynyl" refers to a monovalent linear or branched chain of from two to six carbon atoms containing one or more triple bonds, such as ethynyl, 2-propynyl, 3-methyl-3-butynyl, and the like.

The term "$C_3$-$C_8$ cycloalkyl" refers to a monovalent chain of from three to eight carbon atoms that form a cyclic structure, such as cyclopropyl, cyclohexylmethyl, α-methyl-2-methylcyclopentylmethyl, and the like.

The term "$C_3$-$C_8$ cycloalkenyl" refers to a monovalent chain of from three to eight carbon atoms containing one or more double bonds that form a cyclic structure, such as 2-cyclopropylethenyl, cyclohex-2-enylmethyl, α-methyl-5-methylcyclopent-2-enylmethyl, and the like.

The term "aryl" refers to a cyclic aromatic radical, optionally containing one or more heteroatoms, such as oxygen, nitrogen, and sulfur, such as phenyl, naphthyl, pyridyl, and the like.

The term "substituted aryl" refers to aryl as described herein, where from one to about three hydrogen atoms on the aryl are substituted with monovalent groups, such as halo, alkyl, haloalkyl, alkoxy, haloalkoxy, alkylthio, haloalkylthio, alkylamino, alkanoyl, cyano, nitro, and the like.

The term "halo" refers to one or more halogens as a substituent selected from the group consisting of fluoro, chloro, bromo, and iodo.

The term "alkoxy" refers to a monovalent linear or branched chain of carbon atoms, and oxygen, such as methoxy, butoxy, 2,4-dimethylbutoxy, and the like.

The term "alkylthio" refers to a monovalent linear or branched chain of carbon atoms, and sulfur, such as methylthio, butylthio, 2,4-dimethylbutylthio, and the like.

The term "alkylamino" refers to one or two independently chosen alkyl groups, said alkyl groups each being a monovalent linear or branched chain of carbon atoms, and nitrogen, such as methylamino, dibutylamino, N-(2,4-dimethylbutyl)-N-methylamino, and the like.

The term "alkanoyl" refers to a monovalent linear or branched chain of carbon atoms, and a carbonyl group, such as acetyl, butanoyl, 2,4-dimethylbutanoyl, and the like.

It is appreciated that any combination of the above terms will refer to the corresponding chemical structures. Hence, "haloalkyl" refers to alkyl, as defined above, substituted with halo, as defined above, such as trifluoromethyl, 2,2-difluoro-1-bromoethyl, 3,3,3,2,1,1-heptafluoro-2-trifluoromethylpropyl, and the like.

Carboxylates useful as anions include alkylcarboxylates, such as acetate, substituted alkylcarboxylates, such as lactate, and haloalkylcarboxylates, such as trifluoroacetate, and the like.

Sulfonates useful as anions include alkylsulfonates, such as mesylate, haloalkylsulfonates, such as triflate and nonaflate, and arylsulfonates, such as tosylate and mesitylate, and the like.

Sulfonimides useful as anions may be mono- or disubstituted sulfonimides, such as methanesulfonimide and bis ethanesulfonimide, optionally halogenated sulfonimides, such as bis trifluoromethanesulfonimide, arylsulfonimides, such as bis(4-methoxybenzene)sulfonamide, and the like.

Phosphonates useful as anions include alkylphosphonates, such as tert-butylphosphonate, and arylphosphonates, such as 3,4-dichlorophenylphosphonate, and the like.

In one embodiment, the liquid ionic compound used for gas purification is a compound selected from the group of imidazolium salts, pyrazolium salts, oxazolium salts, thiazolium salts, triazolium salts, pyridinium salts, pyridazinium salts, pyrimidinium salts, and pyrazinium salts. Illustrative of such compounds are 1-ethyl-3-methylimidazolium chloride, 1-butyl-3-ethylimidazolium chloride, 1-butyl-3-methylimidazolium chloride, 1-butyl-3-methylimidazolium bromide, 1-methyl-3-propylimidazolium chloride, 1-methyl-3-hexylimidazolium chloride, 1-methyl-3-octylimidazolium chloride, 1-methyl-3-decylimidazolium chloride, 1-methyl-3-dodecylimidazolium chloride, 1-methyl-3-hexadecylimidazolium chloride, 1-methyl-3-octadecylimidazolium chloride, 1-ethylpyridinium bromide, 1-ethylpyridinium chloride, 1-butylpyridinium chloride, and 1-benzylpyridinium bromide, 1-butyl-3-methylimidazolium tetrafluoroborate, 1-butyl-3-methylimidazolium iodide, 1-butyl-3-methylimidazolium nitrate, 1-ethyl-3-methylimidazolium tetrafluoroborate, 1-ethyl-3-methylimidazolium bromide, 1-ethyl-3-methylimidazolium iodide, 1-ethyl-3-methylimidazolium nitrate, 1-butylpyridinium tetrafluoroborate, 1-butylpyridinium bromide, 1-butylpyridinium iodide, 1-butylpyridinium nitrate, 1-butyl-3-methylimidazolium hexafluorophosphate, 1-octyl-3-methylimidazolium hexafluorophosphate, 1-octyl-3-methylimidazolium tetrafluoroborate, 1-ethyl-3-methylimidazolium ethylsulfate, 1-butyl-3-methylimidazolium triflate, 1-butyl-3-methylimidazolium acetate, 1-butyl-3-methylimidazolium trifluoroacetate, and 1-butyl-3-methyl imidazolium bis(trifluormethylsulfonyl)imide.

In another embodiment, the liquid ionic compound is used in a conventional gas/liquid absorption unit. The gas/liquid absorption unit may be operated as a batch process or as a flow process. The flow processes may be operated in such a manner that the LIC flows co-currently or counter-currently relative to the flow of the gas stream to be purified or separated. The liquid ionic compounds of the present invention can be prepared by any of preparation methods known in the art, such as by halide salt metathesis and acid-base neutralization reactions. Preparations are illustratively described in U.S. Pat. No. 6,048,388, incorporated herein by reference. For example, a 1-alkyl-3-methyl imidazolium halide can be prepared by mixing 1-methylimidazole with an alkylhalide either neat or optionally in a suitable organic solvent, such as acetonitrile or ethyl acetate. Solvents may be advantageously chosen to generate a homogenous mixture of the resulting LIC or a heterogeneous mixture consisting primarily of two layers. In the latter, the layers may be separated for easy isolation of the LIC layer from the reaction mixture.

A new class of ionic liquid-solid-polymer mixed matrix membrane has now been developed to improve the longer term stability of ionic liquids encapsulated in the membranes. To make these the new IL-solid-polymer mixed matrix membranes, solids such as carbon molecular sieves, microporous molecular sieves, MCM-41 type of mesoporous molecular sieves, or polymers of intrinsic microporosity (PIM) are coated (or impregnated) with ionic liquids such as 1-butyl-3-methyl imidazolium bis(trifluormethylsulfonyl)imide or other ionic liquids as listed above. The ionic liquid coated or impregnated solids are then dispersed in the continuous polymer matrix to form mixed matrix membranes. The ionic liquids were stabilized by the solid comprising molecular sieves or polymers of intrinsic microporosity. These hybrid mixed matrix membranes combine the properties of the continuous polymer phase, the ionic liquids, and the dispersed ionic liquid coated or impregnated solids phase, which will open up new opportunities for gas separation processes such as $CO_2$ separation from natural gas.

Four types of solids were used to stabilize the ionic liquids in experiments and also to enhance gas separation properties. Hence, four types of ionic liquid-solid-polymer mixed matrix membranes are described herein.

The first type of ionic liquid-solid-polymer mixed matrix membranes comprises three components: a continuous polymer matrix, microporous molecular sieves as fillers dispersed therein, and ionic liquids coated on the surfaces of the microporous molecular sieves or impregnated inside the micropores and mesopores of the microporous molecular sieves. This type of mixed matrix membranes exhibits a mixed matrix membrane effect with both improved $\alpha_{CO_2/CH_4}$ (>10%) and $P_{CO_2}$ compared to those of the pure polymer matrix. The combination of the ionic liquids and the molecular sieve fillers enhances both the $\alpha_{CO_2/CH_4}$ and $P_{CO_2}$. Examples of preferred microporous molecular sieves include: NaX, NaA, AlPO-18, AlPO-14, SAPO-34, SAPO-18, AlPO-17, AlPO-34, SAPO-44, SAPO-47, SAPO-17, CVX-7, SAPO-35, SAPO-56, AlPO-52, SAPO-43, SSZ-62, UZM-9, UZM-26, UZM-27, UZM-13, Silicalite, Si-MEL, MCM-65, MCM-47, Si-DDR, Si-BEA, 3A, 4A, and 5A.

The second type of ionic liquid-solid-polymer mixed matrix membranes also comprises three components: a continuous polymer matrix, carbon molecular sieves as fillers dispersed therein, and ionic liquid coated on the surfaces of the carbon molecular sieves or impregnated inside the micropores and mesopores of the carbon molecular sieves. The ionic liquids and carbon molecular sieve fillers enhances $P_{CO_2}$ and $\alpha_{CO_2/CH_4}$ simultaneously relative to the pure polymer matrix.

The third type of ionic liquid-solid-polymer mixed matrix membranes also comprises three components: a continuous polymer matrix, a MCM-41 type of mesoporous molecular sieves as filler dispersed therein, and ILs coated on the surfaces of the MCM-41 type of mesoporous molecular sieves or impregnated inside the mesopores of the MCM-41 type of mesoporous molecular sieves. It is expected that the ILs and MCM-41 type of mesoporous molecular sieves fillers will enhance $P_{CO_2}$ and $\alpha_{CO_2/CH_4}$ simultaneously relative to the pure polymer matrix.

The fourth type of ionic liquid-solid-polymer mixed matrix membranes also comprises three components: a continuous polymer matrix, polymers of intrinsic microporosity (PIMs) as fillers dispersed therein, and ionic liquids coated on the surfaces of PIMs or impregnated inside the micropores and mesopores of the PIMs. The ionic liquids and PIM fillers enhance $P_{CO_2}$ and $\alpha_{CO_2/CH_4}$ simultaneously relative to the pure polymer matrix.

These four types of mixed matrix membranes exhibit a remarkable synergestic effect between the two different dispersed fillers (ILs and porous materials) and the polymer matrix, which significantly enhances the $CO_2/CH_4$ or $CO_2/N_2$ gas separation performance of the continuous polymer matrix.

The mixed matrix membranes described in the following examples were prepared.

Example 1

Preparation of 6%[bmin][Tf$_2$N]-20% PIM1-Matrimid Mixed Matrix Membrane

6%[bmin][Tf$_2$N]-20% PIM1-Matrimid mixed matrix membrane was prepared by solution casting a polymer solution containing dispersed 1-butyl-3-methyl imidazolium bis (trifluormethylsulfonyl)imide ([bmin][Tf$_2$N])-impregnated PIM1 fillers ([bmin][Tf$_2$N]/Matrimid=6% by weight and PIM1/Matrimid=20% by weight). 0.7 gram of Matrimid 5218 polymer was dissolved in 20 grams of $CH_2Cl_2$ solvent by stirring at room temperature to form a polymer solution (Solution A). 0.14 gram of PIM1 polymer synthesized as described in the literature (see McKeown, et al., CHEM. COMMUN., 2004, 230) was dissolved in 10 gram of $CH_2Cl_2$ solvent to form a Solution B, then 0.042 gram of [bmin][Tf$_2$N] synthesized as described in the literature (see Bonhôte, et al., Inorg. Chem., 1996, 35, 1168) was added to Solution B. The resulting Solution B was stirred and ultrasonicated to remove the bubbles from the micropores of PIM1 and to ensure the impregnation of [bmim][Tf$_2$N] into the micropores of PIM1. Then, the $CH_2Cl_2$ solvent was removed from Solution B under reduced pressure to obtain [bmim][Tf$_2$N]-impregnated PIM1 fillers. The [bmim][Tf$_2$N]-impregnated PIM1 fillers were then added to Solution A, and then Solution A was stirred and ultrasonicated to form a good dispersion. The casting Solution A with 20 wt-% (to polymer matrix) of PIM1 loading and 30 wt-% (to PIM1) of [bmim][Tf$_2$N] loading was poured into a glass ring on top of a clean glass plate, and dried at room temperature for 24 hours. The resulting dried mixed matrix membrane was detached from the glass plate and was further dried at room temperature for at least 24 hours, at 110° C. for at least 24 hours, and then at 150° C. for at least 24 hours under vacuum. The resulting 6%[bmim][Tf$_2$N]-20% PIM1-Matrimid mixed matrix membrane was around 2-3 mils thick, measured with a micrometer. It was cut into small circles for gas separation measurements using a dense film test unit.

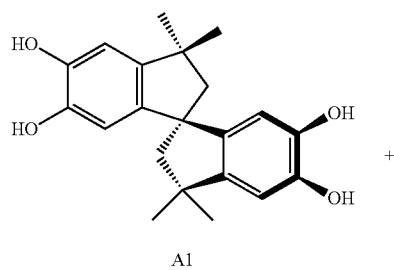

A1

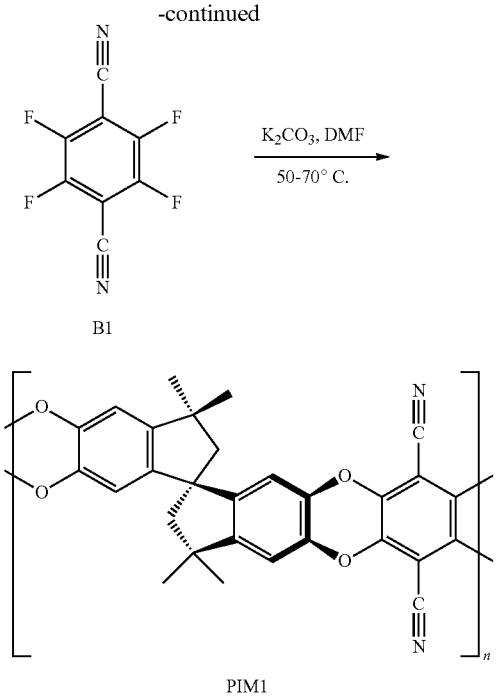

B1

PIM1

Synthesis of PIM1. Reagents and conditions: i) K$_2$CO$_3$, DMF, 80-120° C. (McKeown, et al., CHEM. COMMUN., 2004 230)

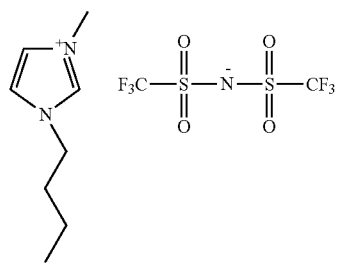

Chemical structure of [bmim][Tf$_2$N]

Example 2

Preparation of 9%[bmim][Tf$_2$N]-30% MCM-41-Ultem Mixed Matrix Membrane

9%[bmim][Tf$_2$N]-30% MCM-41-Ultem mixed matrix membrane was prepared by solution casting a polymer solution containing dispersed [bmim][Tf$_2$N]-impregnated MCM-41 fillers ([bmim][Tf$_2$N]/Ultem=9% by weight and MCM-41/Ultem=30% by weight). 0.7 gram of Ultem polyetherimide polymer was dissolved in 20 grams of $CH_2Cl_2$ solvent by stirring at room temperature to form a polymer solution (Solution A). 0.21 gram of MCM-41 mesoporous silica was dispersed in 10 grams of $CH_2Cl_2$ solvent to form a Slurry B, then 0.063 g of [bmim][Tf$_2$N] was added to Slurry B. The resulting Slurry B was stirred and ultrasonicated to remove the bubbles from the mesopores of MCM-41 and to ensure the impregnation of C$_4$mimTf$_2$N into the mesopores of MCM-41. Then, the $CH_2Cl_2$ solvent was removed from Slurry B under reduced pressure to obtain [bmim][Tf$_2$N]-impregnated MCM-41 fillers. The [bmim][Tf$_2$N]-impregnated MCM-41 fillers were then added to Solution A, and then Solution A was stirred and ultrasonicated to form a good dispersion. The casting Solution A with 30 wt-% (to polymer matrix) of MCM-41 loading and 30 wt-% (to MCM-41) of [bmim][$Tf_2N$] loading was poured into a glass ring on top of a clean glass plate, and dried at room temperature for 24 hours. The resulting dried mixed matrix membrane was detached from the glass plate and was further dried at room temperature for at least 24 hours, at 110° C. for at least 24 hours, and then at 150° C. for at least 24 hours under vacuum. The resulting 9%[bmim][$Tf_2N$]-30% MCM-41-Ultem mixed matrix membrane was around 2-3 mils thick, measured with a micrometer. It was cut into small circles for gas separation measurements using dense film test unit.

Example 3

Preparation of 9%[bmim][$Tf_2N$]-30% Carbon Molecular Sieve-Ultem Mixed Matrix Membrane 9%[bmim][$Tf_2N$]-30% carbon molecular sieve-Ultem mixed matrix membrane was prepared by solution casting a polymer solution containing dispersed [bmim][$Tf_2N$]-impregnated carbon molecular sieve fillers ([bmim][$Tf_2N$]/Ultem=9% by weight and carbon molecular sieve/Ultem=30% by weight). 0.7 g of Ultem polyetherimide polymer was dissolved in 20 g of $CH_2Cl_2$ solvent by stirring at room temperature to form a polymer solution (Solution A). 0.21 g of carbon molecular sieve was dispersed in 10 g of $CH_2Cl_2$ solvent to form a Slurry B, then 0.063 g of [bmim][$Tf_2N$] was added to Slurry B. The resulting Slurry B was stirred and ultrasonicated to remove the bubbles from the micro- and meso-pores of carbon molecular sieve and to ensure the impregnation of [bmim][$Tf_2N$] into the micro- and meso-pores of carbon molecular sieve. Then, the $CH_2Cl_2$ solvent was removed from Slurry B under reduced pressure to obtain [bmim][$Tf_2N$]-impregnated carbon molecular sieve fillers. The [bmim][$Tf_2N$]-impregnated carbon molecular sieve fillers were then added to Solution A, and then Solution A was stirred and ultrasonicated to form a good dispersion. The casting Solution A with 30 wt-% (to polymer matrix) of carbon molecular sieve loading and 30 wt-% (to carbon molecular sieve) of [bmim][$Tf_2N$] loading was poured into a glass ring on top of a clean glass plate, and dried at room temperature for 24 hours. The resulting dried mixed matrix membrane was detached from the glass plate and was further dried at room temperature for at least 24 hours, at 110° C. for at least 24 hours, and then at 150° C. for at least 24 hours under vacuum. The resulting 9%[bmim][$Tf_2N$]-30% carbon molecular sieve-Ultem mixed matrix membrane was around 2-3 mils thick, measured with a micrometer. It was cut into small circles for gas separation measurements using dense film test unit.

Example 4

Preparation of 9%[bmim][$Tf_2N$]-NaX-Ultem Mixed Matrix Membrane

9%[bmim][$Tf_2N$]-NaX-Ultem mixed matrix membrane was prepared by solution casting a polymer solution containing dispersed [bmim][$Tf_2N$]-impregnated NaX fillers ([bmim][$Tf_2N$]/Ultem=9% by weight and NaX/Ultem=30% by weight). 0.7 g of Ultem polyetherimide polymer was dissolved in 20 g of $CH_2Cl_2$ solvent by stirring at room temperature to form a polymer solution (Solution A). 0.21 g of NaX was dispersed in 10 g of $CH_2Cl_2$ solvent to form a Slurry B, then 0.063 g of [bmim][$Tf_2N$] was added to Slurry B. The resulting Slurry B was stirred and ultrasonicated to remove the bubbles from the micropores of NaX and to ensure the impregnation of [bmim][$Tf_2N$] into the micropores and mesopores of NaX. Then, the $CH_2Cl_2$ solvent was removed from Slurry B under reduced pressure to obtain [bmim][$Tf_2N$]-impregnated NaX fillers. The [bmim][$Tf_2N$]-impregnated NaX fillers were then added to Solution A, and then Solution A was stirred and ultrasonicated to form a good dispersion. The casting Solution A with 30 wt-% (to polymer matrix) of NaX loading and 30 wt-% (to NaX) of [bmim][$Tf_2N$] loading was poured into a glass ring on top of a clean glass plate, and dried at room temperature for 24 hours. The resulting dried mixed matrix membrane was detached from the glass plate and was further dried at room temperature for at least 24 hours, at 110° C. for at least 24 hours, and then at 150° C. for at least 24 hours under vacuum. The resulting 9%[bmim][$Tf_2N$]-NaX-Ultem mixed matrix membrane was around 2-3 mils thick, measured with a micrometer. It was cut into small circles for gas separation measurements using dense film test unit.

Example 5

Preparation of 30%[bmim][$PF_6$]-30% NaY-Matrimid Mixed Matrix Membrane

30%[bmim][$PF_6$]-30% NaY-Matrimid mixed matrix membrane was prepared by solution casting a polymer solution containing dispersed 1-butyl-3-methylimidazolium hexafluorophosphate ([bmim][$PF_6$])-impregnated NaY fillers ([bmim][$PF_6$]/Matrimid=30% by weight and NaY/Matrimid=30% by weight). 0.8 g of Matrimid polyimide polymer was dissolved in 20 g of $CH_2Cl_2$ solvent by stirring at room temperature to form a polymer solution (Solution A). 0.24 g of NaY was dispersed in 10 g of $CH_2Cl_2$ solvent to form a Slurry B, then 0.24 g of 1-butyl-3-methylimidazolium hexafluorophosphate ([bmim][$PF_6$], purchased from Fluka) was added to Slurry B. The resulting Slurry B was stirred and ultrasonicated to remove the bubbles from the micropores of NaY and to ensure the impregnation of [bmim][$PF_6$] into the micropores and mesopores of NaY. Then, the $CH_2Cl_2$ solvent was removed from Slurry B under reduced pressure to obtain [bmim][$PF_6$]-impregnated NaY fillers. The [bmim][$PF_6$]-impregnated NaY fillers were then added to Solution A, and then Solution A was stirred and ultrasonicated to form a good dispersion. The casting Solution A with 30 wt-% (to polymer matrix) of NaY loading and 30 wt-% (to NaY) of [bmim][$PF_6$] loading was poured into a glass ring on top of a clean glass plate, and dried at room temperature for 24 hours. The resulting dried mixed matrix membrane was detached from the glass plate and further dried at room temperature for at least 24 hours at 110° C., and then at 150° C. for at least 24 hours under vacuum. The resulting 30% [bmim][$PF_6$]-30% NaY-Matrimid mixed matrix membrane was around 2-3 mils thick, measured with a micrometer. It was cut into small circle for gas separation measurements.

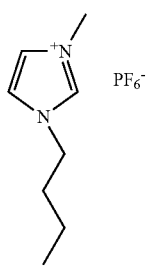

Chemical Structure of [bmim][PF$_6$]

The permeabilities of $CO_2$, $N_2$ and $CH_4$ ($P_{CO2}$, $P_{N2}$ and $P_{CH4}$) and ideal selectivity for $CO_2/CH_4$ ($\alpha_{CO2/CH4}$) and for $CO_2/N_2$ ($\alpha_{CO2/N2}$) of the ionic liquid-solid-polymer mixed matrix membranes were measured by pure gas measurements at 50° C. under 690 kPa (100 psig) pressure.

For $CO_2/N_2$ separation, the ionic liquid-solid-polymer mixed matrix membranes containing ionic liquid-impregnated solid fillers dispersed in the continuous polymer matrices offer improved $CO_2/N_2$ selectivity compared to that of pure polymer matrix. The intrinsic gas transport properties of the ionic liquid and solid fillers as well as the polymer matrix phase determine the gas separation properties of the ionic liquid-solid-polymer mixed matrix membranes.

For example, as shown in the following table, the $P_{CO2}$ of 30%[bmim][PF$_6$]-30% NaY-Matrimid mixed matrix membrane prepared in Example 5 containing 30 wt-% of [bmim][PF$_6$] ionic liquid impregnated into 30 wt-% of NaY microporous zeolite fillers which are dispersed in the continuous Matrimid polymer matrix increased 14.5% of $CO_2/N_2$ selectivity ($\alpha_{CO2/N2}$) compared to the pure Matrimid polymer membrane.

Pure gas permeation results of Matrimid membrane and 30%[bmim][PF$_6$]-30% NaY-Matrimid mixed matrix membrane for $CO_2/N_2$ separation [a]

| Film | $P_{CO2}$ (barrer) | $P_{N2}$ (barrer) | $\alpha_{CO2/N2}$ | $\alpha_{CO2/N2}$ increase |
|---|---|---|---|---|
| Matrimid | 10.0 | 0.403 | 24.8 | — |
| 30% [bmim][PF$_6$]-30% NaY-Matrimid | 5.57 | 0.196 | 28.4 | 14.5% |

[a]Testing conditions: Pure gas permeation, 50° C., 690 kPa (100 psig); 1 barrer = $10^{-10}$ cm$^3$(STP).cm/cm$^2$.sec.cmHg.

What is claimed is:

1. A process of preparation of a mixed matrix membrane comprising first impregnating or coating at least one type of molecular sieve selected from the group consisting of microporous molecular sieves, mesoporous molecular sieves, carbon molecular sieves or polymers of intrinsic microporosity with one or more ionic liquids to provide a coated or impregnated molecular sieve or polymer of intrinsic microporosity and then dispersing said coated or impregnated molecular sieve or polymer of microporosity in a continuous polymer matrix followed by solution casting and drying to form said mixed matrix membrane.

2. The process of claim 1 wherein said continuous polymer matrix comprises one or more polymers selected from the group consisting of polysulfones; poly(styrenes), styrene-containing copolymers, polycarbonates; cellulosic polymers, polyimides, polyetherimides, and polyamides, aryl polyamides, aryl polyimides, aryl polyetherimides; polyethers; poly(arylene oxides); poly(esteramide-diisocyanate); polyurethanes; polyesters, polysulfides; poly(ethylene), poly(propylene), poly(butene-1), poly(4-methyl pentene-1), polyvinyls, polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above polymers.

3. The process of claim 2 wherein said continuous phase comprises one or more polymers selected from the group consisting of polyimides, polyetherimides, and polyamides.

4. The process of claim 1 wherein said ionic liquid is represented by a formula:

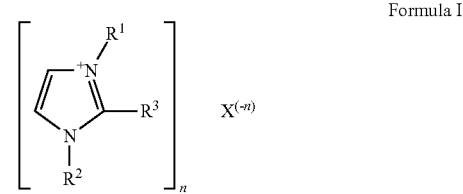

Formula I where: $R^1$ is hydrogen, $C_1$-$C_{18}$ alkyl, or $C_1$-$C_6$ alkylamine; $R^2$ is $C_1$-$C_{18}$ alkyl, $C_2$-$C_6$ alkenyl, $C_3$-$C_6$ cycloalkyl, $C_3$-$C_8$ cycloalkenyl, aryl, substituted aryl, aryl($C_1$-$C_4$ alkyl), or substituted aryl($C_1$-$C_4$ alkyl); $R^3$ is hydrogen, $C_1$-$C_{18}$ alkyl, $C_2$-$C_6$ alkenyl, $C_3$-$C_6$ cycloalkyl, $C_3$-$C_8$ cycloalkenyl, aryl, substituted aryl, aryl($C_1$-$C_4$ alkyl), or substituted aryl($C_1$-$C_4$ alkyl); and X is an anion selected from the group consisting of hydroxide, chloride, bromide, iodide, borate, tetrafluoroborate (BF$_4^-$), cuprate, Cu(I)Cl$_2$ anion, phosphate, hexafluorophosphate (PF$_6^-$), hexafluoroantimonate, perchlorate, nitrite, nitrate, sulfate, methylsulfate, bis(trifluormethylsulfonyl)imide (Tf$_2$N$^-$), a carboxylate, a sulfonate, a sulfonimide, and a phosphonate; and n is an integer from 1 to 4.

5. The process of claim 1 wherein said ionic liquid is represented by a formula:

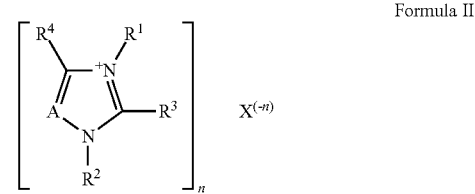

Formula II where: $R^1$ is hydrogen, $C_1$-$C_{18}$ alkyl, or $C_1$-$C_6$ alkylamine; A is —N— or —C(R$^5$)—; $R^2$ is $C_1$-$C_{18}$ alkyl, $C_2$-$C_6$ alkenyl, $C_3$-$C_6$ cycloalkyl, $C_3$-$C_8$ cycloalkenyl, aryl, substituted aryl, aryl($C_1$-$C_4$ alkyl), or substituted aryl($C_1$-$C_4$ alkyl); $R^3$, $R^4$, and $R^5$ are independently hydrogen, $C_1$-$C_{18}$ alkyl, $C_2$-$C_6$ alkenyl, $C_3$-$C_6$ cycloalkyl, $C_3$-$C_8$ cycloalkenyl, aryl, substituted aryl, aryl($C_1$-$C_4$ alkyl), or substituted aryl($C_1$-$C_4$ alkyl); X is an anion selected from the group consisting of hydroxide, chloride, bromide, iodide, borate, tetrafluoroborate, cuprate, Cu(I)Cl$_2$ anion, phosphate, hexafluorophosphate, hexafluoroantimonate, perchlorate, nitrite, nitrate, sulfate, methylsulfate, bis(trifluormethylsulfonyl)imide (Tf$_2$N$^-$), a carboxylate, a sulfonate, a sulfonimide, and a phosphonate; and n is an integer from 1 to 4.

6. The process of claim 1 wherein said ionic liquid is represented by a formula:

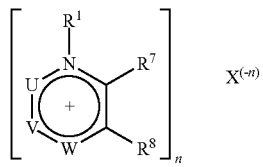

where: $R^1$ hydrogen, $C_1$-$C_{18}$ alkyl or $C_1$-$C_6$ alkylamine; U, V, and W are independently —N— or —C($R^9$)—, provided that U and V are not simultaneously —N—; $R^7$, $R^8$, and $R^9$ are independently hydrogen, $C_1$-$C_6$ alkyl, $C_2$-$C_6$ alkenyl, $C_3$-$C_6$ cycloalkyl, $C_3$-$C_8$ cycloalkenyl, aryl, substituted aryl, aryl ($C_1$-$C_4$ alkyl), or substituted aryl($C_1$-$C_4$ alkyl); X is an anion selected from the group consisting of hydroxide, chloride, bromide, iodide, borate, tetrafluoroborate, cuprate, Cu(I)Cl$_2$ anion, phosphate, hexafluorophosphate, hexafluoroantimonate, perchlorate, nitrite, nitrate, sulfate, a carboxylate, a sulfonate, methylsulfate, bis(trifluormethylsulfonyl)imide (Tf$_2$N$^-$), a sulfonimide, and a phosphonate; and n is an integer from 1 to 4.

7. The process of claim 1 wherein said ionic liquid is selected from the group consisting of 1-ethyl-3-methylimidazolium chloride, 1-butyl-3-ethylimidazolium chloride, 1-butyl-3-methylimidazolium chloride, 1-butyl-3-methylimidazolium bromide, 1-methyl-3-propylimidazolium chloride, 1-methyl-3-hexylimidazolium chloride, 1-methyl-3-octylimidazolium chloride, 1-methyl-3-decylimidazolium chloride, 1-methyl-3-dodecylimidazolium chloride, 1-methyl-3-hexadecylimidazolium chloride, 1-methyl-3-octadecylimidazolium chloride, 1-ethylpyridinium bromide, 1-ethylpyridinium chloride, 1-butylpyridinium chloride, and 1-benzylpyridinium bromide, 1-butyl-3-methylimidazolium tetrafluoroborate, 1-butyl-3-methylimidazolium iodide, 1-butyl-3-methylimidazolium nitrate, 1-ethyl-3-methylimidazolium tetrafluoroborate, 1-ethyl-3-methylimidazolium bromide, 1-ethyl-3-methylimidazolium iodide, 1-ethyl-3-methylimidazolium nitrate, 1-butylpyridinium tetrafluoroborate, 1-butylpyridinium bromide, 1-butylpyridinium iodide, 1-butylpyridinium nitrate, 1-butyl-3-methylimidazolium hexafluorophosphate, 1-octyl-3-methylimidazolium hexafluorophosphate, 1-octyl-3-methylimidazolium tetrafluoroborate, 1-ethyl-3-methylimidazolium ethylsulfate, 1-butyl-3-methylimidazolium triflate, 1-butyl-3-methylimidazolium acetate, 1-butyl-3-methylimidazolium trifluoroacetate, and 1-butyl-3-methyl imidazolium bis(trifluormethylsulfonyl)imide.

8. The process of claim 1 wherein said microporous molecular sieves are selected from the group consisting of NaX, NaA, AlPO-18, AlPO-14, SAPO-34, SAPO-18, AlPO-17, AlPO-34, SAPO-44, SAPO-47, SAPO-17, CVX-7, SAPO-35, SAPO-56, AlPO-52, SAPO-43, SSZ-62, UZM-9, UZM-26, UZM-27, UZM-13, Silicalite, Si-MEL, MCM-65, MCM-47, Si-DDR, Si-BEA, 3A, 4A, and 5A.

9. The process of claim 1 wherein mesoporous molecular sieve is a MCM-41 type of mesoporous molecular sieve.

10. The process of claim 1, further comprising ultrasonicating to remove bubbles from the at least one type of molecular sieve after impregnating or coating.

11. The process of claim 9, further comprising ultrasonicating to remove bubbles from the at least one type of molecular sieve after impregnating or coating.

12. A process of preparation of a mixed matrix membrane comprising first impregnating or coating at least one type of molecular sieve selected from the group consisting of microporous molecular sieves, mesoporous molecular sieves, carbon molecular sieves or polymers of intrinsic microporosity with one or more ionic liquids to provide a coated or impregnated molecular sieve or polymer of intrinsic microporosity, ultrasonicating to remove bubbles from the at least one type of molecular sieve after impregnating or coating, and then dispersing said coated or impregnated molecular sieve or polymer of microporosity in a continuous polymer matrix followed by solution casting and drying to form said mixed matrix membrane.

13. The process of claim 12 wherein mesoporous molecular sieve is a MCM-41 type of mesoporous molecular sieve.

14. A process of preparation of a mixed matrix membrane comprising first impregnating or coating a MCM-41 mesoporous molecular sieve with one or more ionic liquids to provide a coated or impregnated MCM-41 mesoporous molecular sieve, ultrasonicating to remove bubbles from the MCM-41 mesoporous molecular sieve after impregnating or coating, and then dispersing said coated or impregnated MCM-41 mesoporous molecular sieve in a continuous polymer matrix followed by solution casting and drying to form said mixed matrix membrane.

* * * * *